C. WHITAKER.
Corn Planter.
No. 25,461.
Patented Sept. 13, 1859.
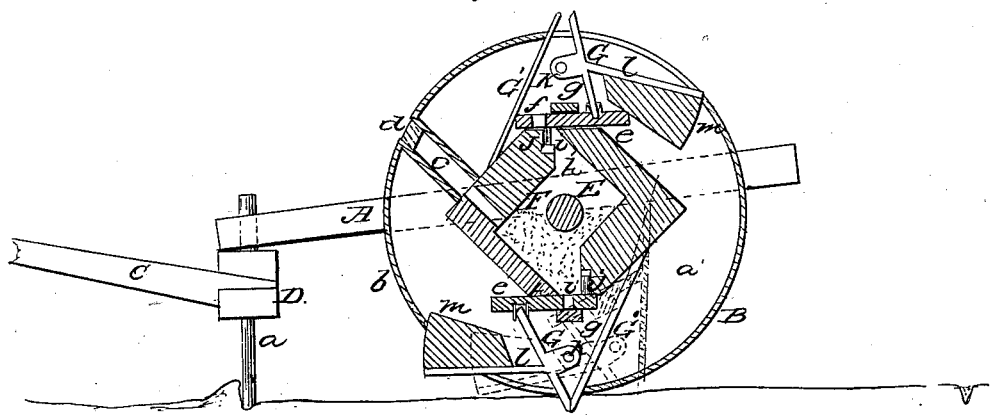
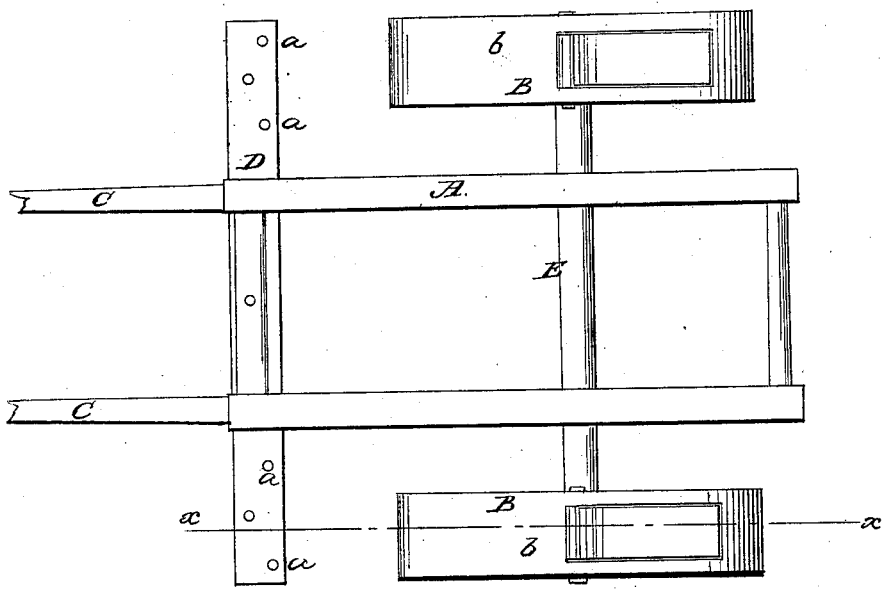

UNITED STATES PATENT OFFICE.

CHARLES WHITAKER, OF DAVENPORT, IOWA.

IMPROVEMENT IN CORN-PLANTERS.

Specification forming part of Letters Patent No. 25,461, dated September 13, 1859.

*To all whom it may concern:*

Be it known that I, C. WHITAKER, of Davenport, in the county of Scott and State of Iowa, have invented a new and Improved Corn-Planter; and I do hereby declare that the following is a full, clear, and exact description of the same, reference being had to the annexed drawings, making a part of this specification, in which—

Figure 1 is a vertical section of my invention, taken in the line $x$ $x$, Fig. 2; Fig. 2, a plan or top view of the same.

Similar letters of reference indicate corresponding parts in both figures.

This invention relates to an improvement in that class of corn-planters in which the corn is distributed from the peripheries of the wheels.

The invention consists in a peculiar distributing device arranged in connection with a seed-receptacle within each wheel, substantially as hereinafter shown and described, whereby a very simple, economical, and efficient machine is obtained for the purpose intended.

To enable those skilled in the art to fully understand and construct my invention, I will proceed to describe it.

A represents a rectangular frame, which is mounted on two wheels, B B, and has thill. C attached to its front end. These thills, instead of being attached directly to the frame A, are attached to a horizontal bar, D, which have teeth $a$ inserted in them to serve as pulverizers. These may be arranged in the usual or in any proper way. The wheels B B are hollow, and may be constructed each of two disks, $a'$, secured on the axle E a suitable distance apart, and covered with sheet metal $b$.

Within each wheel B a square box or seed-receptacle, F, is formed, as shown plainly in Fig. 1. These receptacles are at the centers of the wheels and concentric with them, and they are filled by means of passages $c$, which extend to the peripheries of the wheels, and are provided with plugs $d$.

At the opposite ends of each receptacle F a slide, $e$, is attached, each slide having an opening, $f$, made through it, and fitted between a stop, $g$, and a bearing-surface, $h$, at the two opposite corners of the boxes, as shown clearly in Fig. 1, the slides working over orifices or apertures $i$ in the seed-boxes F, each orifice or aperture having a cut-off brush, $j$, attached.

In each wheel B two plates, G G, are placed and fitted on pins $k$ $k$, the plates being allowed to work freely on said pins. The inner ends of these plates are fitted in notches in the slides $e$ $e$, and each plate has an arm, $l$, attached, to which arms weights $m$ are secured. The outer ends of the plates G G bear against stationary plates G' G', which are placed in the wheels B B, and in positions somewhat tangential with the seed-boxes F F, as shown plainly in Fig. 1.

The operation of the machine is as follows: The boxes or receptacles F F are supplied with seed and the stoppers or plugs $d$ inserted in the orifices of the passages $c$. As the machine is drawn along the outer ends of the plates G G' penetrate the ground as said plates reach a point directly underneath the axle E. (See Fig. 1.) The plates G G' form the hole to receive the seed, and their outer ends are in contact when they penetrate the ground; but as the wheels rotate the plates G are separated from G' in consequence of the arms $l$ coming in contact with the ground. The plates G, by their movement, actuate the slides $e$, and the openings $f$ of the slides discharge the seed into the holes made by the plates G G'. (See red lines, Fig. 1.) As the plates G G' pass down at the front part of the wheels the plates G close by the gravity of the arms $l$ and weights $m$ and again penetrate the earth for a succeeding hill or dropping.

This device is exceedingly simple and efficient. It may be constructed at a reasonable cost, and there are no parts liable to get out of repair by use.

I do not claim broadly distributing seed from the periphery of the wheels, for this has been done in various ways; but

I claim as new and desire to secure by Letters Patent—

The arrangement of the seed boxes or receptacles F, slides $e$, stationary plates G', and movable plates G, with the arms and weights $m$ attached, substantially as and for the purpose set forth.

CHARLES WHITAKER.

Witnesses:
ALPHEUS SMITH,
H. D. SHATTUCK.